(12) United States Patent
Gaudreau et al.

(10) Patent No.: US 11,679,385 B2
(45) Date of Patent: Jun. 20, 2023

(54) FILTER LIFE INDICATOR MEDIA AND HOLDER

(71) Applicant: ENTEGRIS, INC., Billerica, MA (US)

(72) Inventors: John C. Gaudreau, Chepachet, RI (US); Evan Warniers, Acton, MA (US); Edward J. Washington, Wrentham, MA (US)

(73) Assignee: ENTEGRIS, INC., Billerica, MA (US)

( * ) Notice: Subject to any disclaimer, the term of this patent is extended or adjusted under 35 U.S.C. 154(b) by 260 days.

(21) Appl. No.: 17/124,375

(22) Filed: Dec. 16, 2020

(65) Prior Publication Data
US 2021/0187494 A1    Jun. 24, 2021

Related U.S. Application Data

(60) Provisional application No. 62/952,557, filed on Dec. 23, 2019.

(51) Int. Cl.
*B01D 46/00* (2022.01)
*G01N 15/08* (2006.01)
*B01L 3/00* (2006.01)

(52) U.S. Cl.
CPC ............ *B01L 3/50* (2013.01); *B01D 46/0086* (2013.01); *G01N 15/08* (2013.01); *B01D 2273/18* (2013.01); *B01L 2300/043* (2013.01); *G01N 2015/084* (2013.01)

(58) Field of Classification Search
CPC ....... B01D 46/00; B01D 2273/18; B01L 3/50; B01L 2300/043; G01N 15/00; G01N 15/08; G01N 2015/084
See application file for complete search history.

(56) References Cited

U.S. PATENT DOCUMENTS

| 4,135,896 | A  | * | 1/1979  | Parish ...................... G21F 9/02 96/417 |
| 5,308,483 | A  |   | 5/1994  | Sklar |
| 6,979,361 | B2 | * | 12/2005 | Mihayiov .......... B01D 46/0086 96/417 |
| 7,201,036 | B2 | * | 4/2007  | Custer ................ B01D 46/0086 73/31.03 |
| 11,291,940 | B2 | * | 4/2022  | Chen .................... B01D 46/442 |

(Continued)

FOREIGN PATENT DOCUMENTS

| CA | 3032923 A1 * | 2/2018 | ......... B01D 46/0086 |
| CN | 107923821 A  | 4/2018 | |
| CN | 208905959 U  | 5/2019 | |

(Continued)

*Primary Examiner* — Nguyen Q. Ha

(57) ABSTRACT

A media sample holder includes a base and a plurality of retention assemblies including retaining tabs and opposing flexible release lever arms, configured to allow attachment of the base to an attachment adapter. The media sample holder can attach a media sample on or near a filter. The media sample holder held in the media sample holder can have a different removal efficiency curve than a removal efficiency curve of the filter. The media sample can be placed at or near the filter for a period of time, then tested to determine the status and/or life of the filter based on the relationship between the remaining life, exposure, or removal efficiency of the filter and the exposure or removal efficiency of the tested media sample.

18 Claims, 10 Drawing Sheets

(56) References Cited

U.S. PATENT DOCUMENTS

2018/0340869 A1   11/2018   Mukaisho

FOREIGN PATENT DOCUMENTS

| | | | |
|---|---|---|---|
| JP | 2002075844 A | 3/2002 | |
| JP | 2002221507 A | 8/2002 | |
| JP | 2009254942 A | 11/2009 | |
| JP | 4579744 B2 | 11/2010 | |
| TW | 200801480 A | 1/2008 | |
| TW | 201807684 A | 3/2018 | |
| WO | WO-2010135221 A3 * | 3/2011 | ........... A62B 18/088 |
| WO | WO-2018005421 A1 * | 1/2018 | ............. B01D 46/00 |

* cited by examiner

FILTER LIFE INDICATOR MEDIA AND HOLDER

CROSS-REFERENCE TO RELATED APPLICATIONS

This application claims the benefit under 35 USC 119 of U.S. Provisional Patent Application No. 62/952,557 filed Dec. 23, 2019, the disclosure of which is hereby incorporated herein by reference in its entirety for all purposes.

FIELD

This disclosure is directed to filter life indicator media samples, holders for such media samples, and determinations of filter life based on the media samples.

BACKGROUND

Filter life testing typically includes destructive testing of a patch cut from the filter or even testing of the entire filter itself once the filter is out of service. This limits the frequency of testing. Further, the testing results may not be reflective of the lifetime of the filter, depending when the patch is taken, or they may be too late to guide decisions regarding the replacement of a filter when the entire filter is tested. The infrequent testing can lead to early discarding of filters or poor responsiveness to filters performing below required levels.

SUMMARY

This disclosure is directed to filter life indicator media samples, holders for such media samples, and determinations of filter life based on the media samples.

By using a sample of media retained in proximity to a filter, the media can be used to evaluate the exposure and effectiveness of the filter without removal of portions of the filter for testing. The samples can be replaced and tested at increased frequencies compared to other filter tests. By using media having removal efficiencies that are known and differ from the removal efficiency of the filter, the media can provide understanding of the exposure of the filter and changes to its removal efficiency even over limited time-spans.

Filters are often in areas that are difficult to access. Quick-release retention tabs operable using a single hand can allow a user to place or remove a media sample holder even in confined or otherwise awkward locations within a filter assembly, and replace or remove the media sample from the holder easily once the holder has been removed.

In an embodiment, a media sample holder includes a base. The base includes a base body including a recess configured to accommodate a media sample, a first opening configured to expose a first portion of the media sample, and a plurality of retention assemblies configured to retain the media sample holder to an attachment adapter. The retention assemblies include a retaining tab extending from the base body and a release lever arm opposite the retaining tab. The release lever arm is flexible, extends from the base body towards the retaining tab, and includes a retaining face at an end towards the retaining tab.

In an embodiment, the media sample holder further includes a lid including a second opening configured to expose a second portion of the media sample, and a hinge joining the base to the lid. The base and the lid are configured to form a snap closure.

In an embodiment, the media sample holder further includes the attachment adapter, and the attachment adapter is configured to be joined to a filter. In an embodiment, the attachment adapter includes a comb configured to mechanically engage pleats in the filter. In an embodiment, the attachment adapter comprises a flat surface on a side opposite where the attachment adapter is configured to engage the plurality of retention assemblies.

In an embodiment, each of the release lever arms further includes a ramped portion configured to release an engagement feature located between the release lever arm and the retaining tab.

In an embodiment, the base includes a melt-processable polymer.

In an embodiment, the retaining face includes a ramped portion that is angled with respect to an opposing face of the retaining tab.

In an embodiment, the media sample holder further includes a media sample located within the recess. The media sample is configured to absorb one or more contaminants selected from acids, bases, volatile organic compounds.

In an embodiment, the media sample has a known removal efficiency curve for the one or more contaminants that is different from a removal efficiency curve of a filter that the media sample holder is configured to be used with.

In an embodiment, the media sample includes absorption media and a membrane surrounding the absorption media, wherein the membrane is sealed at a perimeter of the media sample.

In an embodiment, the media sample holder further includes an inlet configured to direct a flow towards the second opening, the inlet having an inlet opening having an area larger than an area of the second opening.

In an embodiment, a method of evaluating a filter includes determining a removal efficiency of a media sample, wherein the media sample has been attached to the filter for a predetermined amount of time, and determining a removal efficiency of the filter based on the removal efficiency of the media sample and the predetermined amount of time. A removal efficiency curve of the media sample is different from a removal efficiency curve of the filter.

In an embodiment, the method further includes attaching the media sample to the filter for the predetermined amount of time using a media sample holder. The media sample holder includes a base including a base body including a recess configured to accommodate a media sample and an opening configured to expose a first portion of the media sample; and a plurality of retention assemblies. The retention assemblies include a retaining tab extending from the base body and a release lever arm opposite the retaining tab, wherein the release lever arm is flexible, extends from the base body towards the retaining tab, and includes a retaining face. The media sample holder further includes a lid including an opening configured to expose a second portion of the media sample and a hinge joining the base to the lid. The base and the lid are configured to form a snap closure.

In an embodiment, attaching the media sample holder to the filter includes engaging the plurality of retention assemblies with a filter comb of the filter.

In an embodiment, attaching the media sample to the filter includes engaging the plurality of retention assemblies with an attachment adapter fixed to the filter.

In an embodiment, the attachment adapter is fixed to the filter by an adhesive.

In an embodiment, the method further includes removing the media sample holder from the filter by flexing the release lever arms.

In an embodiment the media sample holder is attached to the filter on an upstream side of the filter.

In an embodiment, the media sample is attached to the filter such that the media sample is parallel to a flow through the filter.

In an embodiment, the media sample is attached to the filter such that the media sample is perpendicular to a flow through the filter.

In an embodiment, the media sample is attached to the filter such that the media sample is angle with respect to flow through the filter.

In an embodiment, a media sample holder includes a base. The base includes a base body including a recess configured to accommodate a media sample and a first opening configured to expose a first portion of the media sample. The base includes a plurality of retention structures configured to retain the media sample holder to an attachment adapter. The retention structures include a fixed wall, a channel bottom, and a camming surface. The camming surface is mounted on a flexible arm. The camming surface opposes the fixed wall. The camming surface, the channel bottom, and the fixed wall are configured to accommodate the attachment adapter when the flexible arm is in a deflected position.

In an embodiment, the media sample holder further includes a lid including a second opening configured to expose a second portion of the media sample and a hinge joining the base to the lid. The base and the lid are configured to form a snap closure.

In an embodiment, the media sample holder further includes the attachment adapter, and the attachment adapter is configured to be joined to a filter.

In an embodiment, the attachment adapter comprises a comb configured to mechanically engage pleats in the filter.

In an embodiment, the attachment adapter comprises a frame having a generally triangular shape and an extension, the frame and the extension providing a flat outer surface, the extension having a thickness such that the retention structures can accommodate the extension.

In an embodiment, the base includes a melt-processable polymer.

In an embodiment, the media sample holder further includes a media sample located at least partially within the recess, the media sample configured to absorb one or more contaminants selected from acids, bases, and volatile organic compounds. In an embodiment, the media sample comprises absorption media and a membrane surrounding the absorption media, wherein the membrane is sealed at a perimeter of the media sample. In an embodiment, the media sample has a known removal efficiency curve for the one or more contaminants that is different from a removal efficiency curve of a filter that the media sample holder is configured to be used with.

In an embodiment, the media sample holder further includes inlet configured to direct a flow towards the second opening, the inlet having an inlet opening having an area larger than an area of the second opening.

In an embodiment, a method of evaluating a filter includes determining a removal efficiency of a media sample. The media sample has been attached to the filter for a predetermined amount of time. The method further includes determining a removal efficiency of the filter based on the removal efficiency of the media sample and the predetermined amount of time. The removal efficiency curve of the media sample is different from a removal efficiency curve of the filter.

In an embodiment, the method attaching the media sample to the filter for the predetermined amount of time using a media sample holder including a base. The base includes a base body including a recess configured to accommodate a media sample and a first opening configured to expose a first portion of the media sample. The base includes a plurality of retention structures configured to retain the media sample holder to an attachment adapter. The retention structures include a fixed wall, a channel bottom, and a camming surface. The camming surface mounted on a flexible arm, wherein the camming surface opposes the fixed wall, and the camming surface, the channel bottom, and the fixed wall are configured to accommodate the attachment adapter when the flexible arm is in a deflected position. The media sample holder also includes a lid including an opening configured to expose a second portion of the media sample and a hinge joining the base to the lid. The base and the lid are configured to form a snap closure.

In an embodiment, attaching the media sample holder to the filter includes engaging the plurality of retention structures with the attachment adapter, wherein the attachment adapter is a filter comb.

In an embodiment, attaching the media sample to the filter includes engaging the plurality of retention structures with an attachment adapter, wherein the attachment adapter comprises a frame having a generally triangular shape and an extension, the frame and the extension providing a flat outer surface, the extension having a thickness such that the retention structures can accommodate the extension.

In an embodiment, the attachment adapter is fixed to the filter by an adhesive. In an embodiment, the attachment adapter is fixed in proximity to the filter.

In an embodiment, the method further includes removing the media sample holder from the filter by pulling the media sample holder away from the attachment adapter.

In an embodiment, the media sample holder is attached to the filter on an upstream side of the filter. In an embodiment, the media sample is attached to the filter such that a plane of the media sample is parallel to a flow through the filter. In an embodiment, the media sample is attached to the filter such that a plane of the media sample is perpendicular to a flow through the filter.

DRAWINGS

DETAILED DESCRIPTION

This disclosure is directed to filter life indicator media samples, holders for such media samples, and determinations of filter life based on the media samples.

Figure 1:
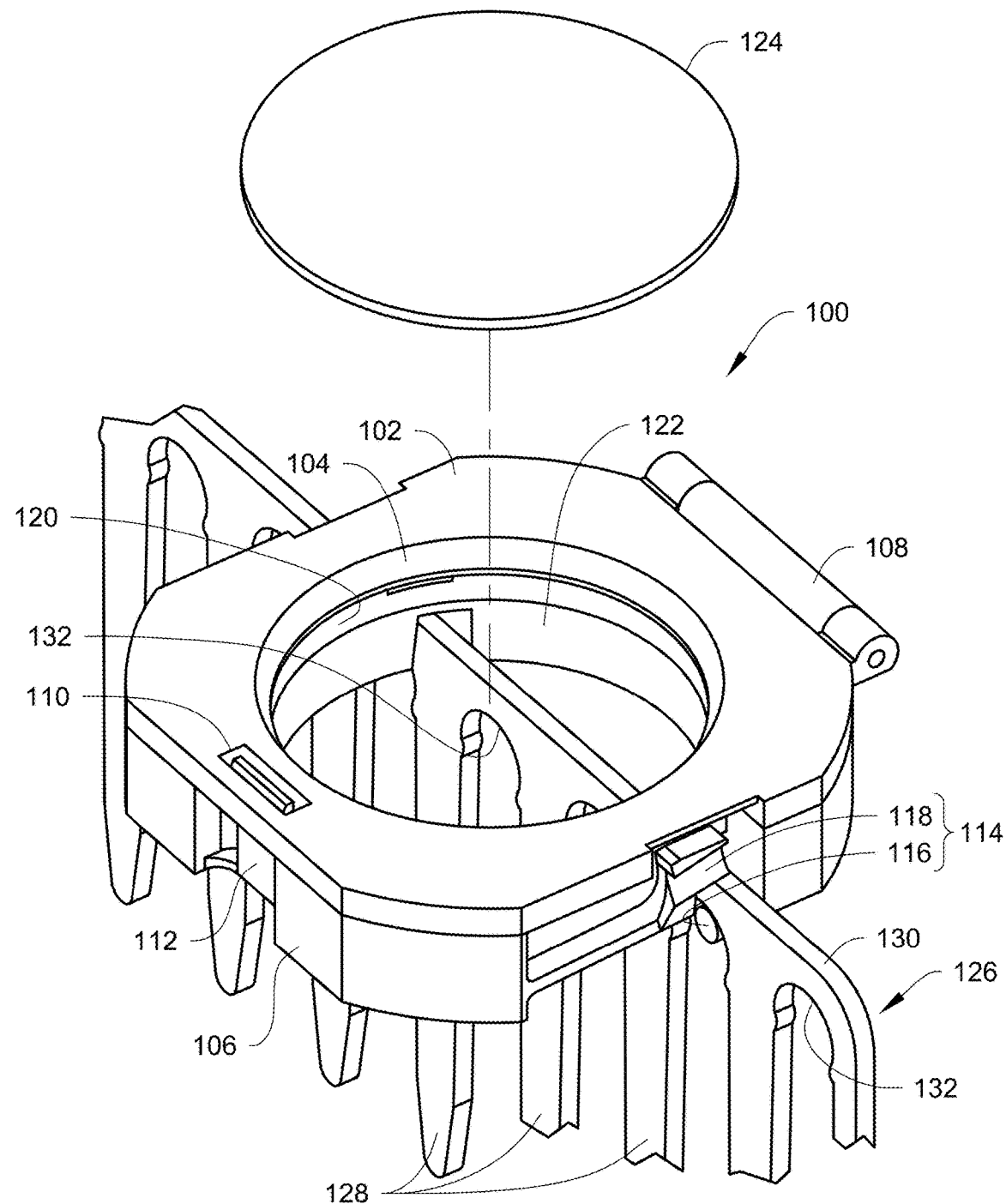
FIG. 1 shows a perspective view of a media sample holder attached to an attachment adapter according to an embodiment.

FIG. 1 shows a perspective view of a media sample holder according to an embodiment. Media sample holder 100 includes lid 102 including lid opening 104. Media sample holder 100 further includes sample holder body 106. Lid 102 is joined to sample holder body 106 by hinge 108. Lid 102 includes an aperture 110, and media sample holder body 106 includes a projection 112 configured to form a snap fit with aperture 110. Media sample holder body 106 further includes retention assemblies 114. Each of the retention assemblies 114 includes a retention tab 116 and a release lever arm 118. Sample holder body 106 also includes a recess 120 and a body opening 122. The media sample holder 100 can accommodate a media sample 124. Media sample holder 100 is joined to an attachment adapter 126. The attachment adapter 126 shown in FIG. 1 is a comb including teeth 128 extending from shaft 130. Shaft 130 includes a plurality of engagement surfaces 132 provided between the teeth 128.

Figure 4A:
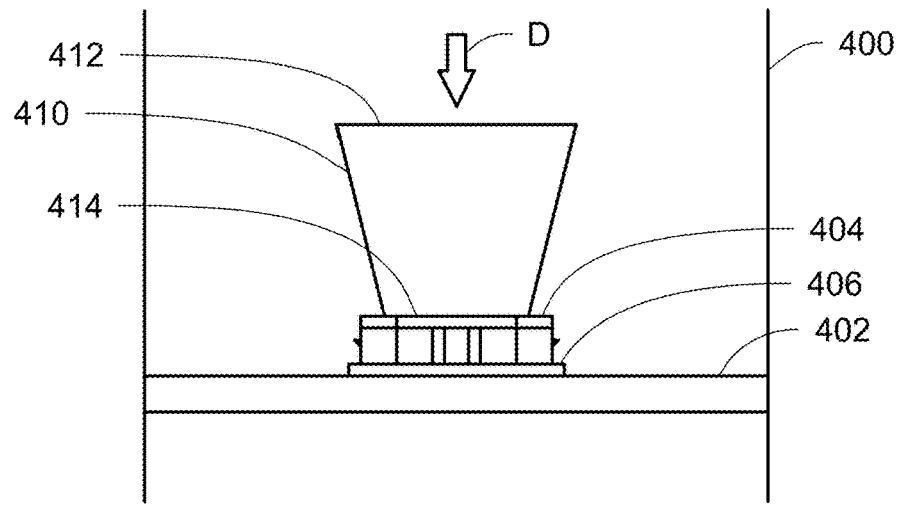
FIG. 4A shows an arrangement of a media sample and a filter according to an embodiment.

Lid 102 forms part of media sample holder 100. When closed, lid 102 partially encloses recess 120 of the sample holder body 106. By enclosing the recess, lid 102 can secure a media sample 124 within the sample holder 100. Lid 102 includes lid opening 104. Lid opening 104 is an aperture formed in lid 102 configured to allow contact between a media sample 124 held in media sample holder 100 and the ambient environment, for example the interior of a duct, at or near a filter. In an embodiment, lid opening 104 is circular. In an embodiment, lid 102 has a chamfer. In an embodiment, an inner perimeter of the lid opening 104 is smaller than a perimeter of the media sample 124, such that the media sample 124 can be retained by lid 102 when lid 102 is closed. In an embodiment, lid opening 104 has a generally circular shape. In an embodiment, an intake can extend from lid opening 104, as shown in FIG. 4A and described below.

Sample holder body 106 forms a main body of the media sample holder 100. Sample holder body 106 can be formed of a polymer material. In an embodiment, the sample holder body 106 includes a melt-processable polymer material.

Hinge 108 joins lid 102 to sample holder body 106. Hinge 108 can include a pin joining a portion of lid 102 to a portion of the sample holder body 106. Hinge 108 allows lid 102 to be rotated with respect to sample holder body 106.

Lid 102 can be secured to sample holder body 106 by, for example, a snap fit. The snap fit can be a snap fit between a snap fit aperture 110 provided on lid 102 and a projection 112 extending from sample holder body 106 at a position corresponding to snap fit aperture 110 on lid 102. The projection 112 can include a portion configured to engage with or catch on snap fit aperture 110 to provide the snap fit. Projection 112 can be flexible, such that the projection 112 can engage aperture 110, but can be flexed out of this engagement to allow lid 102 to be opened away from sample holder body 106 about hinge 108.

Retention assemblies 114 are provided on sample body holder 106. The retention assemblies can be used to affix media sample holder 100 to an attachment adapter 126. The retention assemblies each include retention tab 116 and a corresponding release lever arm 118. In an embodiment, a media sample holder 100 includes two retention assemblies 114, disposed on opposing sides of the media sample holder. In an embodiment, the media sample holder has a generally square or rectangular shape, with one pair of opposing sides including hinge 108 and the snap fit including snap fit aperture 110 and projection 112, and the other pair of opposing sides each having a retention assembly 114 disposed thereon.

Retention tab 116 projects from sample holder body 106. Retention tab 116 is sized and shaped to engage with an engagement surface 132 of an attachment adapter 126.

Release lever arm 118 extends from sample holder body 106 towards retention tab 116. Release lever arm 118 is flexible such that it can be flexed towards lid 102. Release lever arm 118 can include one or more projections, texturing, overmolded polymer material, or any other suitable gripping surface to facilitate an operator gripping release lever arm 118. Release lever arm 118 provides a surface positioned opposite an end of retention tab 116 when in an unflexed state. The surface of release lever arm 118 opposing retention tab 116 can contact retention tab 116 or be spaced apart from retention tab 116 by a distance too small to allow passage of a portion of an attachment adapter 126. The spacing between release lever arm 118 and retention tab 116 when release lever arm 118 is in the unflexed state can retain an attachment adapter 126 in a position where an engagement surface 132 is contacting retention tab 116. When flexed towards lid 102, the surface of the release lever arm 118 is moved such that the engagement surface 132 can be disengaged from retention tab 116 such that the media sample holder 100 can be removed from the attachment adapter 126. In an embodiment, lid 102 can include cutouts that are placed and positioned to facilitate flexing of the release lever arm.

Recess 120 is a recess formed in sample holder body 106. Recess 120 is formed in a surface facing lid 102 when lid 102 is closed to sample holder body 106. Recess 120 can be sized such that it can accommodate a media sample 124. Recess 120 can be in communication with lid opening 104 and body opening 122. Recess 120 can have a perimeter that is larger than either lid opening 104 or body opening 122. In an embodiment, recess 120 is generally circular in shape.

Body opening 122 is an opening between recess 120 and a bottom of the sample holder body 106. Body opening 122 can expose a side of a media sample 124 opposite the side exposed through the lid opening 104 when the media sample 124 is disposed in recess 120. This exposure can allow media sample 124 to absorb contaminant from an ambient environment. Body opening 122 can have a chamfer or a taper as it extends from recess 120 to the bottom of the sample holder body 106. In an embodiment, body opening 122 is generally circular in shape.

Media sample 124 is a sample including an absorbent media that can be held by the sample media holder 100. Media sample 124 can include an absorbent for one or more contaminants. The one or more contaminants can include, as non-limiting examples, acids, bases, volatile organic compounds, and ionic contaminants. Non-limiting examples of contaminants include acetic acid, sulfuric acid, toluene, ammonia, and the like. Media sample 124 can include a porous membrane surrounding the absorbent media. The membrane can be formed by sealing a perimeter of two membranes, for example using an ultrasonic weld. In an embodiment, media sample 124 has a generally planar shape. In an embodiment, media sample 124 has a generally circular disc shape. Media sample 124 can be sized to fit within recess 120 but large enough that it cannot pass through either lid opening 104 or body opening 122. Media sample 124 can be retained between lid 102 and sample holder body 106 when lid 102 is closed, and can be removed from the sample media holder 100 when lid 102 is opened. In an embodiment, media sample 124 has a predetermined removal efficiency and/or a predetermined relationship between removal efficiency and exposure to contaminants. In an embodiment, the predetermined removal efficiency is less than a removal efficiency of a filter to which sample media holder 100 can be attached. In an embodiment, the predetermined relationship of removal efficiency to exposure is defined by a curve that covers less area and has a lower height than a curve of the relationship between removal efficiency and exposure for a filter to which sample media holder 100 can be attached. The media sample can include any absorbent media including, as non-limiting examples, activated carbon, ion exchange resins or other ion exchangers, treated carbons, engineered carbons, carbons on resins, reagents affixed to fibers, or any other such suitable absorbent media capable of absorbing one or more contaminants.

Attachment adapter 126 is an adapter allowing attachment and removal of the media sample holder 100. The attachment adapter 126 can be fixed at or near a filter to be evaluated using media sample 124. In an embodiment, the attachment adapter 126 is fixed to the filter directly. In an embodiment, the attachment adapter 126 is fixed near the filter, for example, on a wall of a duct or fluid passage including the filter. In an embodiment, the attachment adapter 126 can be an integral feature of a filter. In an embodiment, the attachment adapter 126 is a comb engaging pleats formed in a filter, as shown in FIG. 1.

In the embodiment shown in FIG. 1, where the attachment adapter 126 is a comb, the comb includes teeth 128 protruding from a shaft 130. Each of the teeth 128 is shaped to extend between pleats of the filter to maintain the shape and separation of the pleats. Shaft 130 is a support along which the teeth 128 are distributed. Gaps exist between each of the teeth 128. At these gaps, the shaft includes engagement surfaces 132. Engagement surfaces 132 have a shape capable of engaging the retention tabs 116 on a surface of the retention tabs facing towards the lid 102. The retention tabs 116 can be shaped to correspond to the engagement surfaces 132, for example having a curvature matching a curvature of the engagement surfaces or squared-off corners matching such corners in the engagement surfaces 132. The media sample holder 100 is sized such that the retention assemblies are spaced apart from one another by a distance that is a distance between engagement surfaces provided on the attachment adapter 126.

Figure 2A:
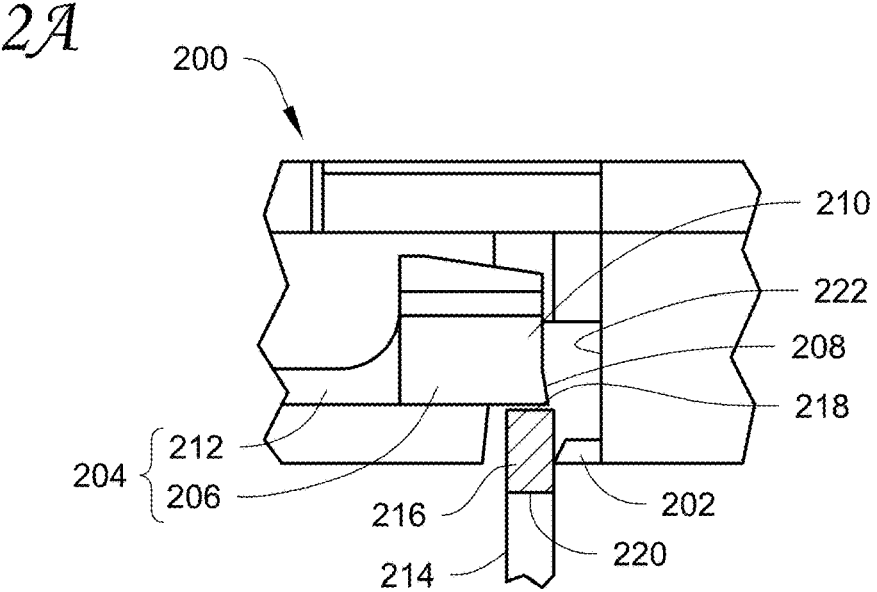
FIGS. 2A-2C shows a side view of attachment of a media sample holder according to an embodiment to an attachment adapter.
Figure 2B:
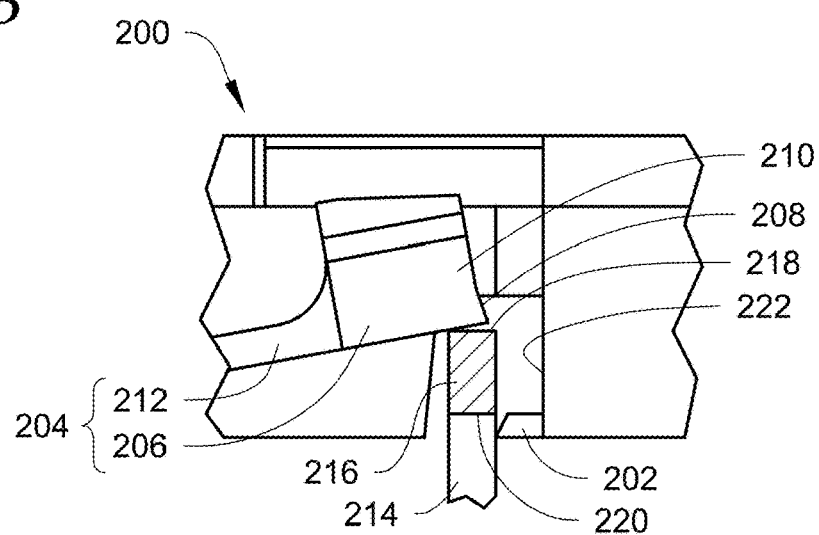
Figure 2C:
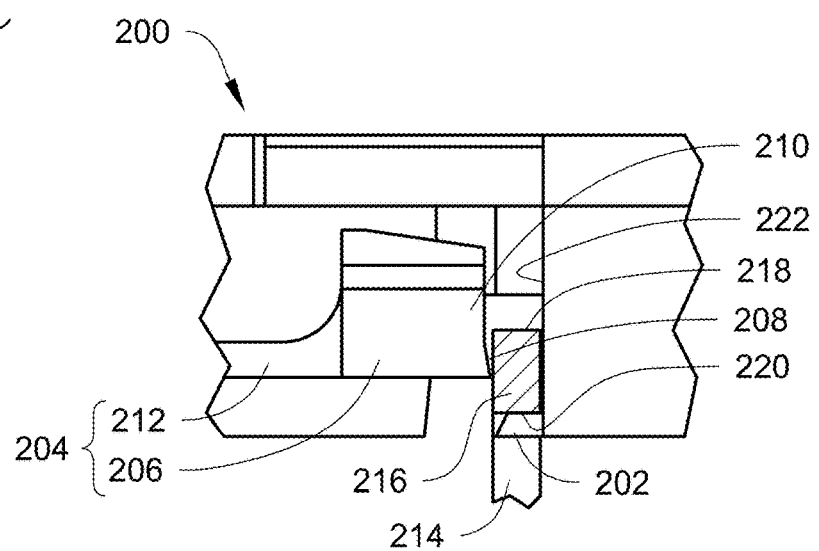

FIGS. 2A-2C shows a side view of attachment of a media sample holder according to an embodiment to an attachment adapter. Media sample holder 200 includes retention tab 202 and release lever arm 204. Release lever arm 204 includes a head 206 including ramped portion 208 at an end 210. Release lever arm 204 further includes a flexible arm 212 joining the head 206 to the media sample holder 200. Attachment adapter 214 includes shaft 216. Shaft 216 has a leading edge 218 and an engagement surface 220 opposite the leading edge 218.

FIG. 2A shows the beginning of attachment of the media sample holder 200 to the attachment adapter 214. As shown in FIG. 2A, the leading edge 218 of shaft 216 of the attachment adapter 214 is brought into contact with head 206 of release lever arm 204. In an embodiment, the leading edge 218 of the shaft 216 can instead be an end of an engagement projection such as engagement projection 308 shown in FIG. 3 and described below. The leading edge 218 presses against head 206 with sufficient force to flex the flexible arm 212, shown in FIG. 2B. The pressing of the leading edge 218 against head 206 can be a result of pressing the media sample holder 200 towards the attachment adapter 214, which can be fixed in proximity to or on a filter.

FIG. 2B shows the release lever arm 204 flexing at flexible arm 212 as the shaft 216 is pressed against the head 206. The flexing of flexible arm 212 moves head 206 such that the engagement surface 220 provided on shaft 216 can pass the retention tab 202. Once the engagement surface 220 is moved past the retention tab 202, the media sample holder 200 is moved such that retention tab 202 engages the engagement surface 220, as shown in FIG. 2C.

FIG. 2C shows the retention tab 202 of media sample holder 200 engaged with the engagement surface 220 of the attachment adapter 214. End 210 of the release lever arm 204 is spaced apart from the opposing side of media sample holder 200 such that the shaft 216 can be accommodated between the ramped surface 208 of the release lever arm 204 and a side 222 of the body of the media sample holder 200. With the shaft 216 within that space, the flexible arm 212 of release lever arm 204 can move back into its unflexed position. When the flexible arm 212 is in the unflexed position, the ramped surface 208 is close to or contacting shaft 216 such that shaft 216 is retained in a position where the retention tab 202 engages the engagement surface 220 of the attachment adapter 214. As a result, media sample holder 200 is retained to the attachment adapter 214. Ramped surface 208 can prevent or reduce the likelihood of shaft 216 rotating out of engagement with the retention tab 202.

Removal of the media sample holder 200 from the attachment adapter 214 can be accomplished by reversing the steps shown, going from the state shown in FIG. 2C to the position shown in FIG. 2B by manually flexing flexible arms 212, releasing the attachment adapter 214 from the retention tab 202, allowing removal of the media sample holder 200.

Figure 3:
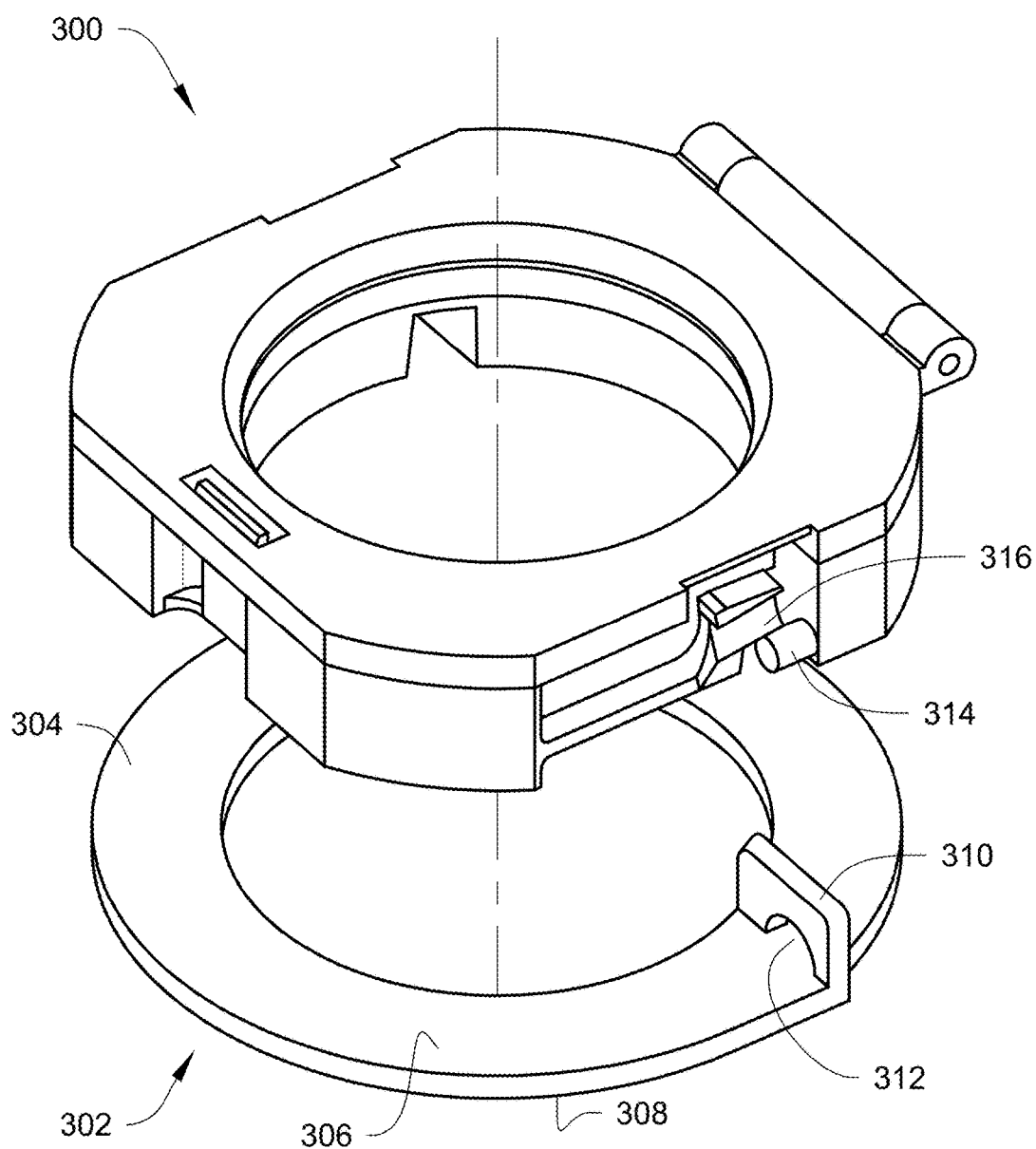
FIG. 3 shows a perspective view of a media sample holder and an attachment adapter according to an embodiment.

FIG. 3 shows a perspective view of a media sample holder and an attachment adapter according to an embodiment. In the embodiment shown in FIG. 3, the media sample holder 300 is attached to an attachment adapter 302. The attachment adapter 302 shown in FIG. 3 includes a body 304. Body 304 has a sample holder facing side 306 and an opposing side 308. Body 304 further includes one or more engagement projections 310. Each of the engagement projections 310 includes an aperture 312 configured to engage with one of the retention tabs 314 of the media sample holder 300. The media sample holder 300 further includes release lever arms 316 opposite the retention tabs securing the engagement of the retention tabs 314 to the apertures 312 in the engagement projections 310.

Media sample holder 300 is a media sample holder such as the media sample holder 100 shown in FIG. 1 and described above. The media sample holder 300 includes a space to accommodate a media sample, for example retaining the media sample between a body and a lid joined by a hinge. The media sample holder 300 includes retention tabs 314 and release lever arms 316 allowing attachment to and removal from the attachment adapter 302.

Attachment adapter 302 is a fitting configured to be joined at or near a filter to allow the removable attachment of media sample holder 300. Attachment adapter 302 includes body 304. Body 304 has a media sample holder facing side 306 and an opposing side 308. The media sample holder facing side 306 includes one or more engagement projections extending from the media sample holder facing side 306. The media sample holder facing side 306 otherwise is configured to avoid interference with the media sample holder 300, for example by being a flat surface. The opposing side 308 allows fixation of the attachment adapter 302 to a filter or a structure near a filter such as a wall of a duct. The opposing side can allow the fixation, for example, by providing a flat surface presenting an adhesive, or by including mounting features such as tabs, slots or flanges or the like, or interfaces for fasteners such as screw holes or the like. In an embodiment, the body 304 of attachment adapter 302 can include one or more beams connecting the media sample holder facing side 306 to the opposing side 308, for example as shown in FIG. 4C and described below. In an embodiment, the media sample holder facing side 306 can be angled with respect to opposing side 308, for example such that a media sample holder 300 attached to the attachment adapter 302 is angled with respect to a part that the opposing side 308 is joined to, for example as shown in FIG. 4C and described below.

Engagement projections 310 extend away from the media sample holder facing side 306. The engagement projections include apertures 312 shaped and sized to accommodate the retention tabs 314 of the media sample holder 300. The apertures 312 extend through the engagement projections 310. Engagement projections 310 extend far enough from the media sample holder facing side 306 of body 304 to allow the ends of the engagement projections to flex the release lever arms 316 and the apertures 312 to engage the retention tabs 314 when the media sample holder 300 is pressed against the attachment adapter 302.

Retention tabs 314 are tabs extending from the body of media sample holder 300. Retention tabs 314 are shaped and sized to engage with the apertures 312 formed in the attachment adapter 302. Retention tabs 314 can be the retention tabs 116 described above and shown in FIG. 1.

Release lever arms 316 extend from the body of media sample holder 300 towards the retention tabs 314, and present a surface opposing the retention tabs. Release lever arms 316 are sized such that engagement projections 310 can be accommodated between an end of the release lever arm 316 and a surface from which a retention tab 314 projects, such that the release lever arm 316 can retain an engagement projection 310 in a position where the retention tab 314 engage an aperture 312. The release lever arm is flexible, such that it is in a retaining position when unflexed, and can be flexed out of the retaining position. Release lever arms 316 can be the release lever arms 118 described above and shown in FIG. 1. When flexed out of the retaining position, the release lever arm 316 can allow insertion of the engagement projection 310 to present aperture 312 to retention tab 314 or allow the aperture 312 and retention tab 314 to be disengaged from one another.

FIG. 4A shows an arrangement of a media sample and a filter according to an embodiment. In FIG. 4A, duct 400 contains filter 402. A media sample holder 404, for example the media sample holder of the embodiments shown and described in FIGS. 1-3, is attached to an attachment adapter 406. The media sample holder 404 contains a media sample (not shown) such as media sample 124 described above and shown in FIG. 1. In the embodiment shown in FIG. 4A, the media sample holder 404, when attached to the attachment adapter 406, holds a media sample such that a plane of the media sample is perpendicular to a direction of flow D. In this perpendicular arrangement, the exposure of the media sample is affected by both diffusion of contaminants and the velocity of flow in direction of flow D. The media sample is held in a position upstream of the filter 402 with respect to the direction of flow D. In the embodiment shown in FIG. 4A, the media sample holder 404 further includes an intake 410. The intake 410 includes a leading edge 412 extending towards the direction of flow D and a trailing edge 414 at the media sample. The leading edge 412 of the intake 410 can have an area larger than the area of the trailing edge 414 and the media sample. The intake 410 can concentrate flow onto the media sample.

Figure 4B:
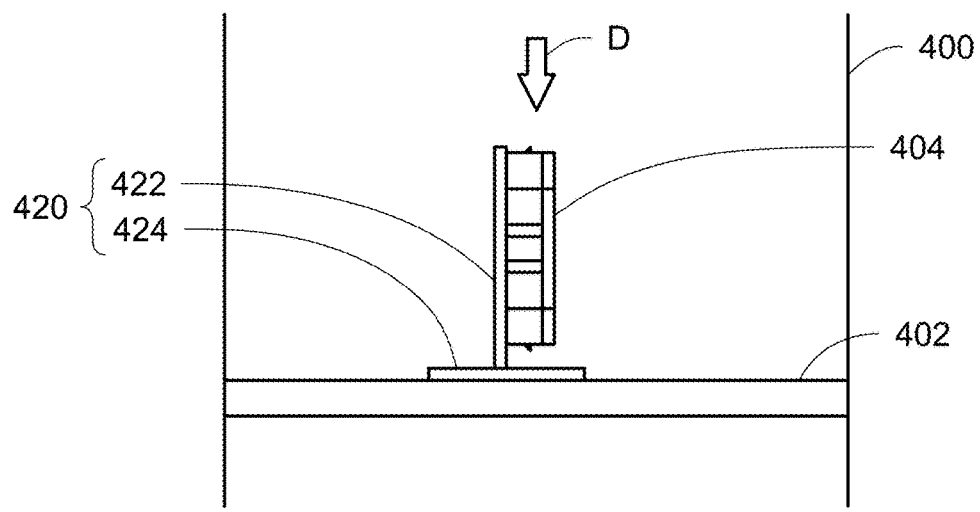
FIG. 4B shows another arrangement of a media sample and a filter according to another embodiment.
Figure 4C:
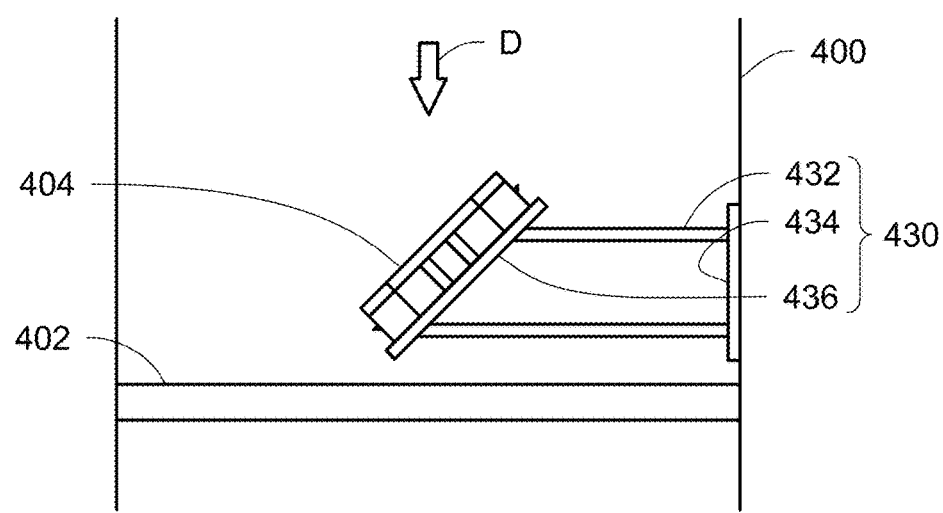
FIG. 4C shows another arrangement of a media sample and a filter according to yet another embodiment.

FIG. 4B shows another arrangement of a media sample and a filter according to an embodiment. In FIG. 4B, duct 400 contains filter 402. A media sample holder 404, for example the media sample holder of the embodiments shown and described in FIGS. 1-3, is attached to an attachment adapter 420 The media sample holder 404 contains a media sample (not shown) such as media sample 124 described above and shown in FIG. 1. In the embodiment shown in FIG. 4B, the media sample holder 404, when attached to the attachment adapter 420, holds the media sample such that a plane of the media sample is parallel to a direction of flow D. In the embodiment shown in FIG. 4B, the attachment adapter 420 includes a projection 422 extending parallel to the direction of flow D. The projection 422 extends from a base 424 that is joined to filter 402. In this parallel arrangement, the exposure of the media sample is affected by primarily the diffusion of contaminants, with little or no velocity of flow in direction of flow D. The media sample is held in a position upstream of the filter 402 with respect to the direction of flow D.

FIG. 4C shows another arrangement of a media sample and a filter according to an embodiment. In FIG. 4B, duct 400 contains filter 402. A media sample holder 404, for example the media sample holder of the embodiments shown and described in FIGS. 1-3, is attached to an attachment adapter 430. In the embodiment shown in FIG. 4C, the attachment adapter 430 is joined to a wall of the duct 400, retaining the media sample holder 404 near the filter 402. The media sample holder 404 contains a media sample (not shown) such as media sample 124 described above and shown in FIG. 1. In the embodiment shown in FIG. 4B, the media sample holder 404, when attached to the attachment adapter 430, holds the media sample such that a plane of the media sample is angled with respect to a direction of flow D. In the embodiment shown in FIG. 4C, the attachment adapter 430 includes a plurality of beams 432 extending to base 434 connected to a wall of duct 400. The beams 432 extend from the base 434 to an interface 436 to which the media sample holder 404 is attached. In this angled arrangement, the exposure of the media sample can be a result of both the diffusion of contaminants and the velocity of flow in direction of flow D, with the relative impact of each effect being based on the particular angle A between the media sample and the direction of flow D. The media sample is held in a position upstream of the filter 402 with respect to the direction of flow D.

Figure 5:
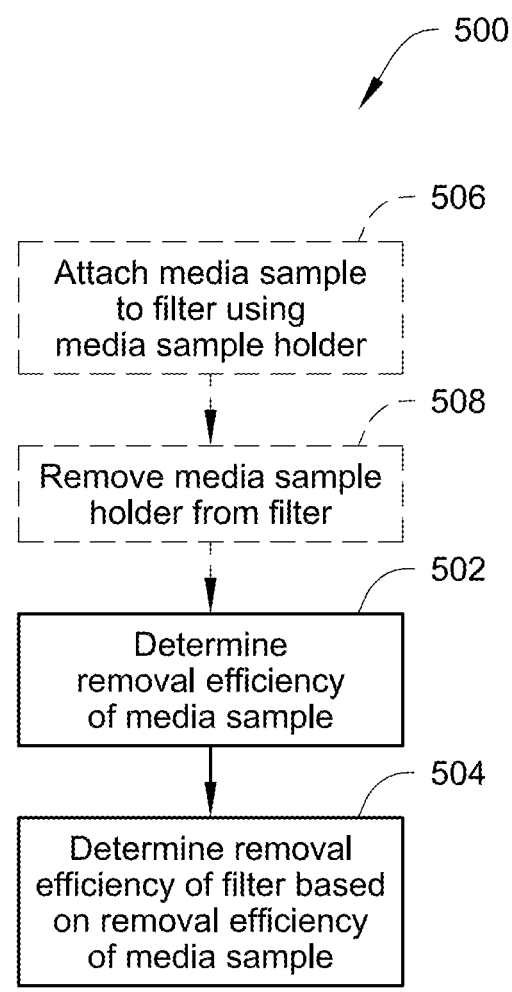
FIG. 5 shows a flowchart of a method for evaluating a filter.

FIG. 5 shows a flowchart of a method for evaluating a filter. In method 500, a removal efficiency is determined for a media sample at 502. A removal efficiency of a filter is determined based on the removal efficiency of the media sample 504. Optionally, the method further includes attaching the media sample to the filter 506 and subsequently removing the media sample from the filter 508.

The removal efficiency of the media sample is determined at 502. The removal efficiency of the media sample can be determined through methods of filter effectiveness testing such as destructive testing and analysis of the media contained therein. Examples of the testing of the media sample at 502 can include, as non-limiting examples, a remaining life test or a solvent test. In an example of the remaining life test, the media sample is challenged with a contaminant having a known concentration for a known period of time or until it affects the filter removal efficiency. In an example of the solvent test, the media sample is added to a solvent dissolving contaminants trapped by the filter, and the resulting solution is tested to identify and quantify the compounds, for example using chromatography. In an embodiment, a media sample or a portion of a media sample can be solvent tested as described above, with the solvent testing used to find a contaminant to challenge another portion or another media sample from the same location with when conducting the remaining life test described above.

The media sample that is analyzed at 502 to determine the removal efficiency is a media sample that has been retained at or near a filter. The media sample can be absorbent media capable of absorbing one or more contaminants. The one or more contaminants can include, for example, acids, bases, volatile organic compounds, or any other suitable chemical of interest that can be trapped or absorbed by media. The media sample is retained at or near the filter in a path of a gas or liquid flow to or through the filter. The media sample can be retained within a duct including the filter. The media sample can be attached to the filter itself, for example on an upstream side of the filter. The media sample can be retained at or near the filter for a known period of time. In an embodiment, the media sample is retained at or near the filter for a predetermined amount of time, such as one month or three months. The amount of time the media sample is retained at or near the filter can be a period of time based on an expected life of the filter. For example, short life filters (ten days to two weeks) can have a predetermined amount of time of between twelve and twenty-four hours. Longer life filters can have predetermined times of, as non-limiting examples, from one month to one year. The media sample has a known relationship between removal efficiency and exposure of the media sample. The known relationship can be predetermined based on the loading of the media sample with absorbent media. The known relationship can be different from the relationship between exposure and removal efficiency for the filter for which removal efficiency is determined at 504. In an embodiment, the media sample can be retained at or near the filter until an event occurs, such as a spill or other such event having a potentially significant impact on filter effectiveness. In an embodiment, two or more media samples can be retained at or near the filter. In such an embodiment, one or more of the media samples can be attached for a predetermined period of time and another one or more of the media samples can be attached only to be removed and tested on the occurrence of an event having potential impact on filter effectiveness. In an embodiment, the two or more media samples can be attached at different positions at or near the filter and each of those samples tested. Media samples attached at different positions can be used to determine spatial effects such as the effects of uneven flows on effective filter life or removal efficiency.

In an embodiment, the media sample is retained at or near the filter in a media sample holder joined to an attachment adapter, such as any of the media sample holders and attachment adapters shown in of FIGS. 1-4C and described above.

At 504, the removal efficiency of the filter is determined based on the removal efficiency of the media sample determined at 502. The removal efficiency can be determined at 504, for example, by using the removal efficiency of the media sample to determine an exposure of the filter during the period where the media sample was retained at or near the filter. The exposure of the media sample can be assessed based on the removal efficiency of the media sample, and the exposure of the media sample can in turn be used to estimate or determine the exposure of the filter itself due to the common environment over the known period.

Optionally, the media sample can be attached to the filter at 506. Attaching the media sample to the filter can include placing the media sample in a media sample holder, and affixing the media sample holder to the filter. The media sample holder can be a media sample holder such as any of those shown in FIGS. 1-4C and described above. The media sample can, for example, be placed into a recess in the media sample holder such as recess 120 described above and shown in FIG. 1, when the media sample holder 100 is opened. The lid of the media sample holder, such as lid 102, can be closed and secured, for example by a snap fit. The media sample holder can then be attached to an attachment adapter, such as those shown in FIGS. 1-4C and described above. The sample holder can use retention tabs, such as retention tabs 116 shown in FIG. 1 and described above to engage the attachment adapter, and release lever arms, such as release lever arms 118 to secure the engagement of the retention tabs.

After attachment of the media sample to the filter at 506, the media sample can be removed 508, such that it can be tested to determine the removal efficiency at 502. The media sample holder can be removed from the attachment adapter. The release lever arms can be flexed away from the retention tabs to allow the retention tabs to be moved out of their engagement with the attachment adapter. Once the retention tabs are out of engagement with the attachment adapter, the media sample holder can be removed. In an embodiment, the release lever arms are positioned such that each of the release lever arms can be gripped and flexed using one hand. In an embodiment, the release lever arms each include a projection configured to provide a grip that facilitates flexing of the release lever arm by a user. Once the media sample holder is removed, the media sample can be removed from the media sample holder, for example by opening a lid of the media sample holder such that the media sample can be removed. The removal of the media sample at 508 can be performed at a known time following the attachment of the media sample at 506. In an embodiment, the removal of the media sample at 508 is performed at a predetermined time following the attachment of the media sample at 506. In an embodiment, the predetermined time can be a predetermined amount of time in the range from approximately one to approximately three months.

Figure 6:
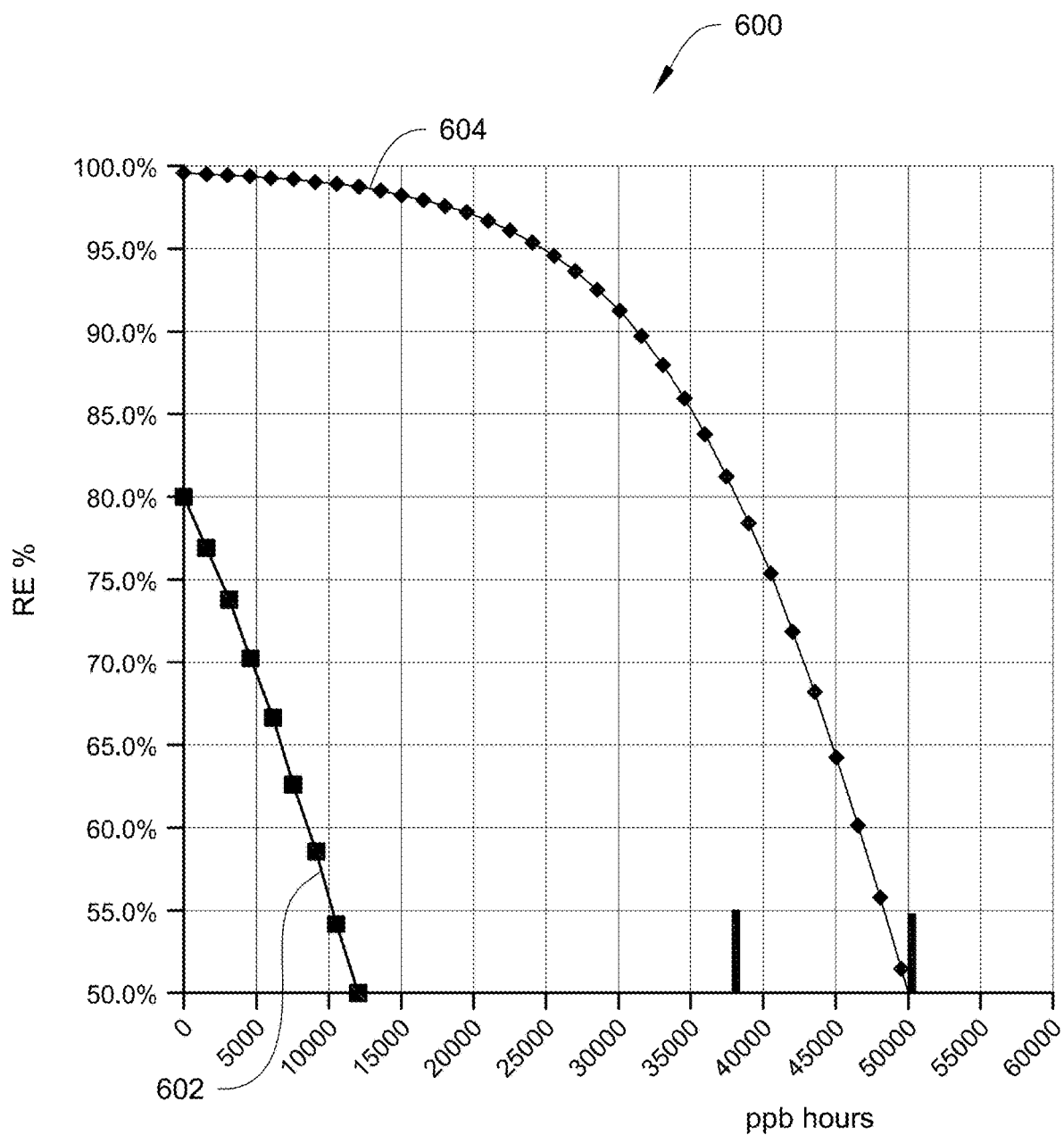
FIG. 6 shows a graph of removal efficiency curves for a filter and for a media sample used in evaluating the filter.

FIG. 6 shows a graph of removal efficiency curves for a filter and for a media sample used in evaluating the filter. In the graph 600, it can be seen that the removal efficiency the media sample 602 is significantly less than the removal efficiency for the filter 604. Further, the removal efficiency of the media sample 602 has a more significant drop-off in response to exposure as can be seen by the shape of the curve when compared to the removal efficiency curve for the filter 604. The relationship between the removal efficiency curves for the sample media and for the filter 604 can be known, allowing an assessment of exposure for the media sample to be associated with an exposure of the filter 604 over the time the media sample was at or near the filter. This association can be used to determine the removal efficiency of the filter based on the exposure of the filter, according to the removal efficiency curve 604 for the filter. The exposure of the filter can be a value in terms of concentration over time, such as parts per billion per hour (ppb/hr). By using a significantly smaller removal efficiency curve for the media sample, exposure can be determined more accurately over shorter periods of time, allowing more frequent assessment of filter exposure, removal efficiency, and remaining life.

Figure 7:
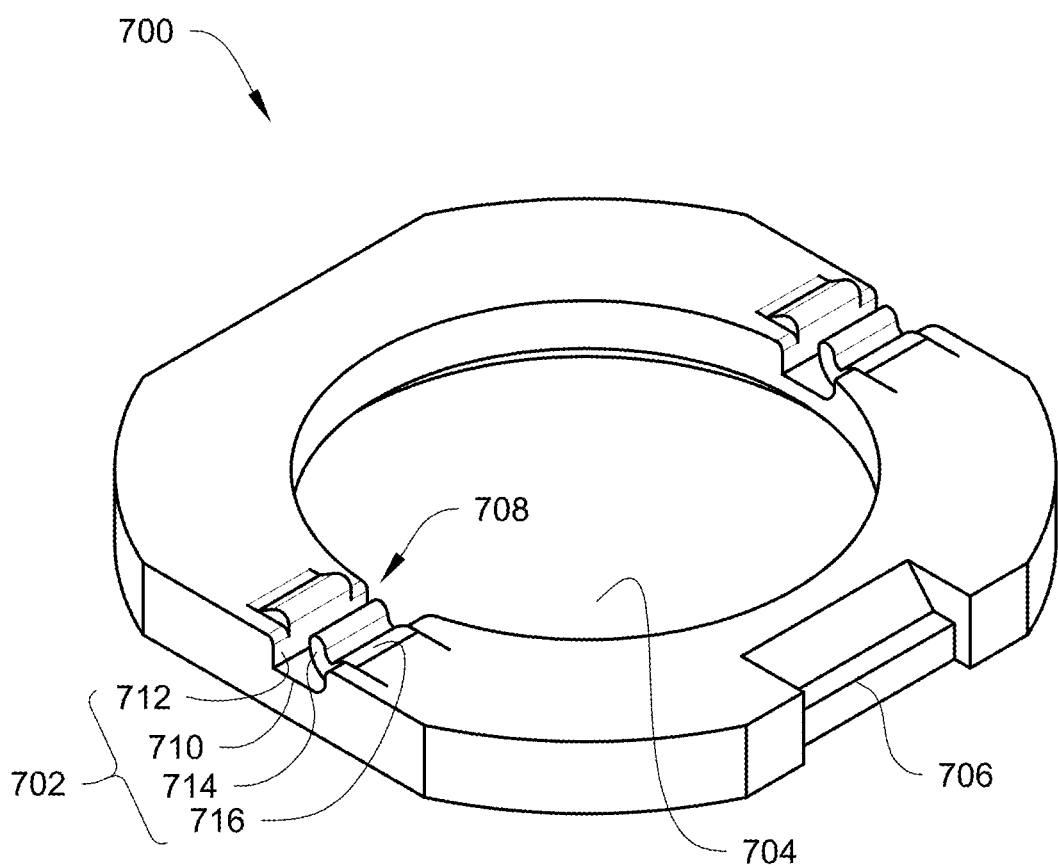
FIG. 7 shows a perspective view of part of a media sample holder according to an embodiment.

FIG. 7 shows a perspective view of part of a media sample holder according to an embodiment. In FIG. 7, media holder body 700 can be seen from a side including retention structures 702. Media holder body 700 also includes a body opening 704. A recess (not shown) can be included on an opposite side of media holder body 700 and sized to at least partially accommodate a media sample within a media holder including media holder body 700. The media holder body can include at least a portion of a hinge structure (not shown) allowing a lid (not shown) to be joined to the media holder body 700. The lid and the media holder body 700 can be secured to one another to close the media holder by mechanical engagement of one or more featured included in the lid with latching surface 706.

The retention structures 702 each include a channel 708 defined at least in part by a bottom 710, a fixed wall 712, and a camming surface 714 opposing the fixed wall. The camming surface 714 is at an end of a flexible arm 716. In embodiments, the bottom 710 and the fixed wall 712 may be shaped such that channel 708 can accommodate a structure that the media holder body 700 is configured to be attached to, such as attachment adapter 1000 described below and shown in FIG. 10, a filter comb, or any other suitable structure. In an example embodiment, the fixed wall 712 and the bottom 710 are each flat surfaces, at a right angle with respect to one another. In an embodiment, an extension of the fixed wall 712 extends beyond a surface of the media holder body 700. Camming surface 714 can be a surface provided opposite fixed wall 712, having a curved profile. Camming surface 714 can be positioned and/or configured such that a distance between the outermost portion of camming surface 714 and the fixed wall 712 is smaller than a thickness of the filter comb, attachment adapter, or any other such feature that is engaged by the retention structure 702. Flexible arm 716 can be configured to deflect when the filter comb, attachment adapter, or other such feature is inserted into the channel 708, such that the camming surface 712 is be moved to a position where the channel 708 can accommodate said filter comb, attachment adapter, or other such feature. When the filter comb, attachment adapter, or other such feature is in channel 708, return force of the flexible arm 716 can provide pressure clamping said filter comb, attachment adapter, or other such feature between fixed wall 712 and camming surface 714. In an embodiment, fixed wall 712 can be replaced by a second camming surface (not shown) on a second flexible arm (not shown), with this second camming surface opposite camming surface 714, with the channel 708 being defined by the bottom 710 and the first and second camming surfaces.

Figure 8:
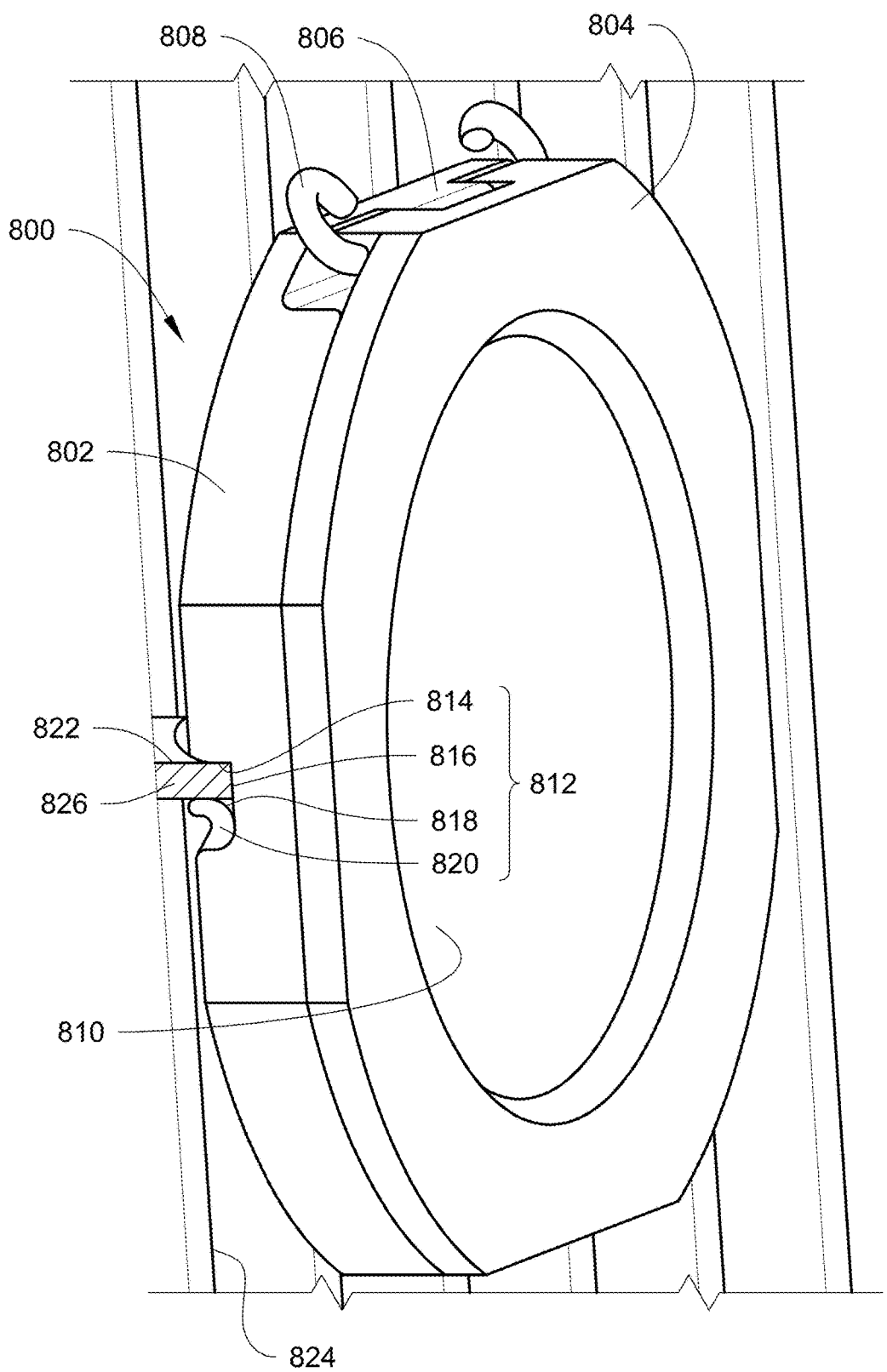
FIG. 8 shows a perspective view of a media sample holder according to an embodiment joined to a comb of a filter.

FIG. 8 shows a perspective view of a media sample holder according to an embodiment joined to a comb of a filter. Media sample holder 800 includes a sample holder body 802 and a sample holder lid 804. The sample holder body 802 and sample holder lid 804 are joined together by hinge 806 including hinge pin 808. The sample holder lid 804 also includes lid opening 810, which can expose a media sample held within media sample holder 800. The sample holder body 802 and sample holder lid 804 can be joined by, for example, a snap (not shown), for example one located opposite the hinge 806.

Media sample holder 800 includes retention structures 812. The retention structures 812 include fixed wall 814, bottom 816, and camming surface 818 opposite fixed wall 814. The camming surface 818 is mounted at an end of flexible arm 820.

Filter comb 822 is a comb configured to separate pleats of filter 824. Filter comb 822 includes rib 826. Media sample holder 800 can be joined to rib 826 by way of retention structures 812. Retention structures 812 can be configured such that a distance between the fixed wall 814 and the camming surface 818 is smaller than a thickness of rib 826 when the flexible arm 820 is in its resting position. Retention structures 812 can further be configured such that they can accommodate rib 826 when flexible arm 820 is deflected.

When the rib 826 and retention structures 812 are pressed together, the flexible arms 820 of each retention structure 812 are deflected by contact of the camming surfaces 818 and the rib 826. The flexible arms 820 are deflected until the rib 826 can be accommodated between camming surfaces 818 and fixed walls 814. The rib 826 and media sample holder 800 can be pressed together until rib 826 also contacts bottom 816. When rib 826 contacts bottom 816, rib 816 can be clamped between camming surface 818 and fixed wall 814 by the return force applied by flexible arms 820.

Figure 9:
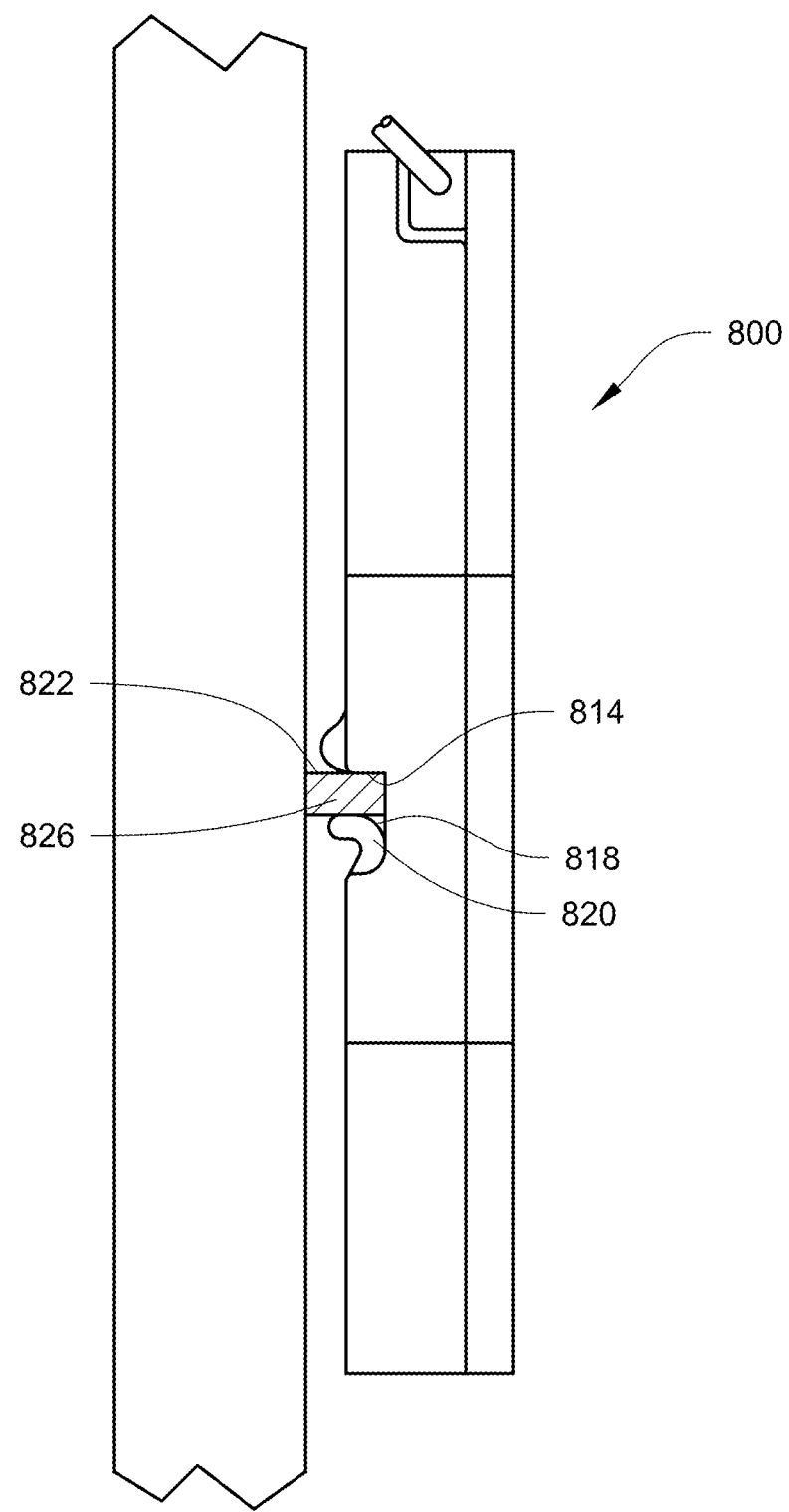
FIG. 9 shows a side view of a media sample holder according to an embodiment joined to a comb of a filter.

FIG. 9 shows a side view of the media sample holder 800 and filter comb 822 of FIG. 8. In the side view of FIG. 9, the deflection of the flexible arm 820 can be seen more clearly, moving the camming surface 818 to a position where the rib 826 can fit between fixed wall 814 and camming surface 818.

Figure 10:
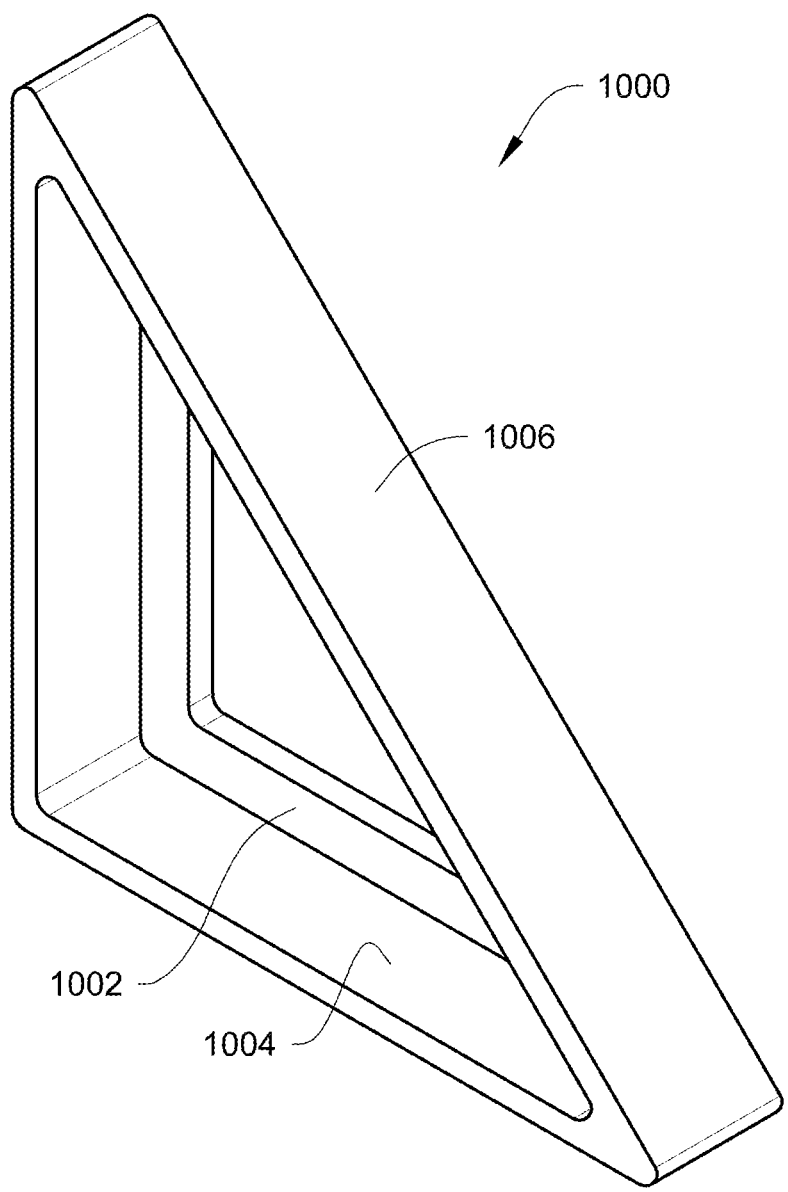
FIG. 10 shows a perspective view of an attachment adapter for a media holder according to an embodiment.

FIG. 10 shows a perspective view of an attachment adapter for a media holder according to an embodiment. Attachment adapter 1000 includes a frame 1002 having a generally triangular shape, and an extension 1004 perpendicular to the plane of the triangular shape. The extension 1004 can have a thickness selected to interface with the attachment features included on a media holder, such as the retention structures 702 or 812 described above and shown in FIGS. 7-9. In an embodiment, the thickness of extension 1004 is selected to be similar or equivalent to a thickness of a filter comb such as filter comb 822 described above and shown in FIGS. 8 and 9. The frame and extension can provide a relatively flat outer surface 1006. Outer surface 1006 can be used to attach the attachment adapter to a surface, for example by way of a two-sided adhesive, an adhesive presenting an engagement surface or attachment features (such as for hook-and-loop attachment or any suitable mechanical engagement) or the like. The attachment adapter 1000 can be, for example, attached to a surface inside a duct or fluid passage including a filter to be monitored using media within the media holder, on a surface of the filter to be monitored, or any other suitable attachment to allow a media holder to be retained within a space of interest.

Aspects:

It is understood that any of aspects 1-14 can be combined with any of aspects 15-24, 25-34, or 35-44. It is understood that any of aspects 15-24 can be combined with any of aspects 25-34 or 35-44. It is understood that any of aspects 25-34 can be combined with any of aspects 35-44.

Aspect 1. A media sample holder, comprising:

a base, wherein the base includes:

a base body including a recess configured to accommodate a media sample and a first opening configured to expose a first portion of the media sample; and a plurality of retention assemblies configured to retain the media sample holder to an attachment adapter including:
a retaining tab extending from the base body; and
a release lever arm opposite the retaining tab, wherein the release lever arm is flexible, extends from the base body towards the retaining tab, and includes a retaining face at an end towards the retaining tab.

Aspect 2. The media sample holder according to aspect 1, further comprising:
a lid including a second opening configured to expose a second portion of the media sample; and
a hinge joining the base to the lid;
wherein the base and the lid are configured to form a snap closure.

Aspect 3. The media sample holder according to any of aspects 1-2, further comprising the attachment adapter, and wherein the attachment adapter is configured to be joined to a filter.

Aspect 4. The media sample holder according to aspect 3, wherein the attachment adapter comprises a comb configured to mechanically engage pleats in the filter.

Aspect 5. The media sample holder according to aspect 3, wherein the attachment adapter comprises a flat surface on a side opposite where the attachment adapter is configured to engage the plurality of retention assemblies.

Aspect 6. The media sample holder according to aspect 5, comprising an adhesive on the flat surface.

Aspect 7. The media sample holder according to any of aspects 1-6, wherein each of the release lever arms further includes a ramped portion configured to release an engagement feature located between the release lever arm and the retaining tab.

Aspect 8. The media sample holder according to any of aspects 1-7, wherein the base includes a melt-processable polymer.

Aspect 9. The media sample holder according to any of aspects 1-8, wherein the retaining face includes a ramped portion that is angled with respect to an opposing face of the retaining tab.

Aspect 10. The media sample holder according to any of aspects 1-9, wherein each of the release lever arms includes a projection on a side opposite the base body.

Aspect 11. The media sample holder according to any of aspects 1-10, further comprising a media sample located within the recess, the media sample configured to absorb one or more contaminants selected from acids, bases, and volatile organic compounds.

Aspect 12. The media sample holder according to aspect 11, wherein the media sample has a known removal efficiency curve for the one or more contaminants that is different from a removal efficiency curve of a filter that the media sample holder is configured to be used with.

Aspect 13. The media sample holder, according to any of aspects 11-12, wherein the media sample comprises absorption media and a membrane surrounding the absorption media, wherein the membrane is sealed at a perimeter of the media sample.

Aspect 14. The media sample holder according to any of aspects 2-13, further comprising an inlet configured to direct a flow towards the second opening, the inlet having an inlet opening having an area larger than an area of the second opening.

Aspect 15. A method of evaluating a filter, comprising:
determining a removal efficiency of a media sample, wherein the media sample has been attached to the filter for a predetermined amount of time; and
determining a removal efficiency of the filter based on the removal efficiency of the media sample and the predetermined amount of time,
wherein a removal efficiency curve of the media sample is different from a removal efficiency curve of the filter.

Aspect 16. The method according to aspect 15, further comprising attaching the media sample to the filter for the predetermined amount of time using a media sample holder including:
a base, wherein the base includes:
a base body including a recess configured to accommodate a media sample and an opening configured to expose a first portion of the media sample; and
a plurality of retention assemblies including
a retaining tab extending from the base body; and
a release lever arm opposite the retaining tab, wherein the release lever arm is flexible, extends from the base body towards the retaining tab, and includes a retaining face
a lid including an opening configured to expose a second portion of the media sample;
a hinge joining the base to the lid;
wherein the base and the lid are configured to form a snap closure.

Aspect 17. The method according to aspect 16, wherein attaching the media sample holder to the filter comprises engaging the plurality of retention assemblies with a filter comb of the filter.

Aspect 18. The method according to aspect 16, wherein attaching the media sample to the filter comprises engaging the plurality of retention assemblies with an attachment adapter fixed to the filter.

Aspect 19. The method according to aspect 18, wherein the attachment adapter is fixed to the filter by an adhesive.

Aspect 20. The method according to any of aspects 16-19, further comprising removing the media sample holder from the filter by flexing the release lever arms.

Aspect 21. The method according to any of aspect 15-20, wherein the media sample holder is attached to the filter on an upstream side of the filter.

Aspect 22. The method according to any of aspects 15-21, wherein the media sample is attached to the filter such that the media sample is parallel to a flow through the filter.

Aspect 23. The method according to any of aspects 15-21, wherein the media sample is attached to the filter such that the media sample is perpendicular to a flow through the filter.

Aspect 24. The method according to any of aspects 15-21, wherein the media sample is attached to the filter such that the media sample is angled with respect to flow through the filter.

Aspect 25. A media sample holder, comprising:
a base, wherein the base includes:
a base body including a recess configured to accommodate a media sample and a first opening configured to expose a first portion of the media sample; and
a plurality of retention structures configured to retain the media sample holder to an attachment adapter, the retention structures including:
a fixed wall;
a channel bottom; and
a camming surface, the camming surface mounted on a flexible arm, wherein the camming surface opposes the fixed wall, and the camming surface, the channel bottom, and the fixed wall are configured to accommodate the attachment adapter when the flexible arm is in a deflected position.

Aspect 26. The media sample holder according to aspect 25, further comprising:

a lid including a second opening configured to expose a second portion of the media sample; and a hinge joining the base to the lid;
wherein the base and the lid are configured to form a snap closure.

Aspect 27. The media sample holder according to any of aspects 25-26, further comprising the attachment adapter, and wherein the attachment adapter is configured to be joined to a filter.

Aspect 28. The media sample holder according to aspect 27, wherein the attachment adapter comprises a comb configured to mechanically engage pleats in the filter.

Aspect 29. The media sample holder according to aspect 27, wherein the attachment adapter comprises a frame having a generally triangular shape and an extension, the frame and the extension providing a flat outer surface, the extension having a thickness such that the retention structures can accommodate the extension.

Aspect 30. The media sample holder according to any of aspects 25-29 wherein the base includes a melt-processable polymer.

Aspect 31. The media sample holder according to any of aspects 25-30, further comprising a media sample located at least partially within the recess, the media sample configured to absorb one or more contaminants selected from acids, bases, and volatile organic compounds.

Aspect 32. The media sample holder according to aspect 31, wherein the media sample comprises absorption media and a membrane surrounding the absorption media, wherein the membrane is sealed at a perimeter of the media sample.

Aspect 33. The media sample holder according to any of aspects 31-32 wherein the media sample has a known removal efficiency curve for the one or more contaminants that is different from a removal efficiency curve of a filter that the media sample holder is configured to be used with.

Aspect 34. The media sample holder according to any of aspects 26-33, further comprising an inlet configured to direct a flow towards the second opening, the inlet having an inlet opening having an area larger than an area of the second opening.

Aspect 35. A method of evaluating a filter, comprising:
determining a removal efficiency of a media sample, wherein the media sample has been attached to the filter for a predetermined amount of time; and
determining a removal efficiency of the filter based on the removal efficiency of the media sample and the predetermined amount of time,
wherein a removal efficiency curve of the media sample is different from a removal efficiency curve of the filter.

Aspect 36. The method according to aspect 35, further comprising attaching the media sample to the filter for the predetermined amount of time using a media sample holder including:
a base, wherein the base includes:
a base body including a recess configured to accommodate a media sample and a first opening configured to expose a first portion of the media sample; and
a plurality of retention structures configured to retain the media sample holder to an attachment adapter, the retention structures including:
a fixed wall;
a channel bottom; and
a camming surface, the camming surface mounted on a flexible arm, wherein the camming surface opposes the fixed wall, and the camming surface, the channel bottom, and the fixed wall are configured to accommodate the attachment adapter when the flexible arm is in a deflected position;
a lid including an opening configured to expose a second portion of the media sample;
a hinge joining the base to the lid; and
wherein the base and the lid are configured to form a snap closure.

Aspect 37. The method according to aspect 36, wherein attaching the media sample holder to the filter comprises engaging the plurality of retention structures with the attachment adapter, wherein the attachment adapter is a filter comb.

Aspect 38. The method according to aspect 36, wherein attaching the media sample to the filter comprises engaging the plurality of retention structures with an attachment adapter, wherein the attachment adapter comprises a frame having a generally triangular shape and an extension, the frame and the extension providing a flat outer surface, the extension having a thickness such that the retention structures can accommodate the extension.

Aspect 39. The method according to aspect 38, wherein the attachment adapter is fixed to the filter by an adhesive.

Aspect 40. The method according to aspect 38, wherein the attachment adapter is fixed in proximity to the filter.

Aspect 41. The method according to any of aspects 36-40, further comprising removing the media sample holder from the filter by pulling the media sample holder away from the attachment adapter.

Aspect 42. The method according to any of aspects 35-41, wherein the media sample holder is attached to the filter on an upstream side of the filter.

Aspect 43. The method according to any of aspects 35-42, wherein the media sample is attached to the filter such that a plane of the media sample is parallel to a flow through the filter.

Aspect 44. The method according to any of aspects 35-43, wherein the media sample is attached to the filter such that a plane of the media sample is perpendicular to a flow through the filter.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A media sample holder, comprising:
a base, wherein the base includes:
a base body having a recess configured to accommodate a media sample and a first opening configured to expose a first portion of the media sample; and
a plurality of retention structures configured to retain the media sample holder to an attachment adapter;
a lid including a second opening configured to expose a second portion of the media sample; and
a hinge joining the base to the lid, wherein the base and the lid are configured to form a snap closure.

2. The media sample holder of claim 1, wherein the plurality of retention structures comprises:
a fixed wall;
a channel bottom; and
a camming surface, the camming surface mounted on a flexible arm, wherein the camming surface opposes the fixed wall, and the camming surface, the channel bottom, and the fixed wall are configured to accommodate the attachment adapter when the flexible arm is in a deflected position.

3. The media sample holder of claim 1, further comprising the attachment adapter, and wherein the attachment adapter is configured to be joined to a filter.

4. The media sample holder of claim 3, wherein the attachment adapter comprises a comb configured to mechanically engage pleats in the filter.

5. The media sample holder of claim 1, wherein the attachment adapter comprises a frame having a generally triangular shape and an extension, the frame and the extension providing a flat outer surface, the extension having a thickness such that the retention structures can accommodate the extension.

6. The media sample holder of claim 1, further comprising the media sample located at least partially within the recess, the media sample configured to absorb one or more contaminants selected from acids, bases, and volatile organic compounds.

7. The media sample holder of claim 6, wherein the media sample has a known removal efficiency curve for the one or more contaminants that is different from a removal efficiency curve of a filter that the media sample holder is configured to be used with.

8. The media sample holder of claim 1, further comprising an inlet configured to direct a flow towards the second opening, the inlet having an inlet opening having an area larger than an area of the second opening.

9. A method of evaluating a filter, comprising:
determining a removal efficiency of a media sample, wherein the media sample has been attached to the filter for a predetermined amount of time; and
determining a removal efficiency of the filter based on the removal efficiency of the media sample and the predetermined amount of time,
wherein a removal efficiency curve of the media sample is different from a removal efficiency curve of the filter.

10. The method of claim 9, further comprising attaching the media sample to the filter for the predetermined amount of time using a media sample holder including:
a base, wherein the base includes:
a base body including a recess configured to accommodate the media sample and a first opening configured to expose a first portion of the media sample; and
a plurality of retention structures configured to retain the media sample holder to an attachment adapter.

11. The method of claim 10, wherein the plurality of retention structures comprises:
a fixed wall;
a channel bottom; and
a camming surface, the camming surface mounted on a flexible arm, wherein the camming surface opposes the fixed wall, and the camming surface, the channel bottom, and the fixed wall are configured to accommodate the attachment adapter when the flexible arm is in a deflected position;
a lid including an opening configured to expose a second portion of the media sample; and
a hinge joining the base to the lid;
wherein the base and the lid are configured to form a snap closure.

12. The method of claim 11, wherein attaching the media sample holder to the filter comprises engaging the plurality of retention structures with the attachment adapter, wherein the attachment adapter is a filter comb.

13. The method of claim 11, wherein attaching the media sample holder to the filter comprises engaging the plurality of retention structures with the attachment adapter, wherein the attachment adapter comprises a frame having a generally triangular shape and an extension, the frame and the extension providing a flat outer surface, the extension having a thickness such that the retention structures can accommodate the extension.

14. The method of claim 10, wherein the attachment adapter is fixed in proximity to the filter.

15. The method of claim 10, wherein the media sample holder is attached to the filter on an upstream side of the filter.

16. The method of claim 9, wherein the media sample is attached to the filter such that a plane of the media sample is parallel to a flow through the filter.

17. The method of claim 9, wherein the media sample is attached to the filter such that a plane of the media sample is perpendicular to a flow through the filter.

18. A filter evaluation device for evaluating a filter, comprising:
a media sample, the media sample having a removal efficiency that is less than a removal efficiency of the filter, and
a holder configured to hold the media sample next to the filter such that the media sample is positioned to allow a flow to pass through the media sample immediately before or after the flow passes through the filter,
wherein the removal efficiency of the media sample has a known relationship with the removal efficiency of the filter.

* * * * *